United States Patent Office 3,397,194
Patented Aug. 13, 1968

3,397,194
PROCESS FOR POLYMERIZATION OF ALPHA-OLE-
FINS USING CCl₄ AND AlR₃ WITH (1) LOW TEM-
PERATURE HIGH IONIZING RADIATION OR (2)
IRON OR NIOBIUM HALIDES
Harold E. Swift, Gibsonia, Pa., assignor to Gulf Re-
search & Development Company, Pittsburgh, Pa., a cor-
poration of Delaware
No Drawing. Filed July 15, 1965, Ser. No. 472,347
25 Claims. (Cl. 260—85.3)

ABSTRACT OF THE DISCLOSURE

A process for the polymerization of olefins, particularly alpha-olefins, having at least four carbon atoms at reduced temperatures using a new catalyst system. The catalyst comprises a halogenated derivative of methane such as carbon tetrachloride plus an organo-aluminum component having at least one carbon to metal bond such as aluminum triethyl. Polymerization occurs at reduced temperatures using irradiation and/or when the catalyst system comprises in addition an iron or niobium halide. Increased yields of polymer are obtained by initially contacting the reaction mixture with an olefin having two to three carbon atoms per molecule.

---

This invention relates to a process for the polymerization of olefinic monomers having at least four carbon atoms per molecule.

The low pressure polymerization of alpha olefins and diolefins with the so-called Ziegler type catalyst system consisting of a partially reduced, heavy, transition metal halide and an organo-aluminum type component to high rensity, solid products is well known in the art.

It was hitherto believed that the presence of the partially reduced, heavy, transition metal halide, usually TiCl₄ or TiCl₃, was essential to the reaction and indeed in the prior art processes, this is true.

It has now been discovered that certain alpha olefinic monomers, i.e., those having at least four carbon atoms per molecule, can be polymerized in the presence of an organo-aluminum component wherein there is at least one carbon to metal bond, provided there is also present a halogenated derivative of methane, such as CCl₄. That this reaction should proceed is doubly surprising in that the interaction of metal alkyls and chlorinated materials such as CCl₄ is known to be explosively reactive.

In accordance with the invention, an olefinic hydrocarbon having at least one alpha olefinic double bond and at least four carbon atoms per molecule is polymerized by a process which comprises contacting at least one of said olefinic hydrocarbons under polymerization conditions with a catalyst system comprising a halogenated derivative of methane containing at least two halogen atoms directly connected to the same carbon atom and an organo-aluminum component having at least one carbon to metal bond.

In one embodiment of this invention, the polymerization of an olefinic hydrocarbon having at least one alpha olefinic double bond and at least four carbon atoms per molecule occurs at reduced temperatures in the presence of a catalyst system comprising:

A halogenated derivative of methane containing at least two halogen atoms directly connected to the same carbon atom;

An organo-aluminum component having at least one carbon to metal bond; and

A metal salt selected from the group consisting of iron halides and niobium halides.

In yet another embodiment of this invention, increased yields of polymer are obtained by a process which comprises:

Contacting a reaction mixture consisting of a halogenated derivative of methane containing at least two halogen atoms directly connected to the same carbon atom; and An organo-aluminum component having at least one carbon to metal bond; with an olefinic hydrocarbon having between 2 and 3 carbon atoms per molecule under polymerization conditions, and thereafter contacting the reaction mixture with an olefinic hydrocarbon having at least one alpha olefinic double bond and at least four carbon atoms per molecule under polymerization conditions.

The charge stock for the process of this invention can be any olefinic hydrocarbon having at least one alpha olefinic double bond and at least four carbon atoms per molecule or a mixture of the same. The charge stock can have one or more double bonds, i.e., can be a monoolefin, diolefin, triolefin, etc., but at least one of the olefinic double bonds must be a so-called alpha or terminal double bond. In addition, it has been found that the charge stock must contain at least four carbon atoms per molecule. The lower carbon number alpha olefins, such as ethylene and propylene, are unsuitable for the process of this invention, as they are substantially unreactive.

The preferred charge stocks for the process of this invention are those represented by the formula:

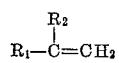

where $R_1$ is selected from the group consisting of hydrogen, a hydrocarbon radical and halogen, and $R_2$ is any hydrocarbon radical, and wherein the sum of the carbon atoms in $R_1$ and $R_2$ is at least two.

The charge stocks can have between 4 and 30 carbon atoms per molecule and preferably have between 4 and 20 carbon atoms per molecule.

Examples of suitable charge stocks include, but are not limited to, butene-1; isobutene; pentene-1; heptene-1; 2-methyl-1-hexene; octene-1; 4,4-dimethyl-1-heptene; 4,4,5-trimethyl-1-hexene; decene-1; 3-butyl-1-octene; 1-pentadecene; 1-octadecene; 2-octyl-1-dodecene; 1-eicosene; 1,2-butadiene; 1,3-butadiene; 1,2-hexadiene; 1,3-hexadiene; 1,4-octadiene; 2-ethyl-1,4-pentadiene; 3,7-dimethyl-1,3-octadiene; styrene; 3-phenyl-1-propene; 1-phenyl-1,3-butadiene; 1,3-divinylbenzene; 1-methyl-4-allylbenzene; vinylcyclopropane; 4-chloro-1-hexene; 3-bromo-1-heptene; and 6-iodo-1-dodecene.

One component of the catalyst system for the process of this invention is a halogenated derivative of methane containing at least two halogen atoms directly connected to the same carbon atom. This component can be represented by the general formula:

where $x_1$ and $x_2$ can be the same or different and represent any halogen atom; and $R_3$ and $R_4$ can be the same or different and are selected from the group consisting of halogen; hydrogen; and any hydrocarbon radical having between 1 and 10 carbon atoms.

Examples of suitable halogenated methane derivatives include, but are not limited to, CCl₄; chloroform; methylene chloride; methylene bromide; methylene iodide; bromoform; iodoform; carbon tetrabromide; carbon tetraiodide; dichlorodifluoromethane; carbon tetrafluoride; ethylidene chloride; ethylidene bromide; 1,1-dichloropentane; 1,1-dibromohexane; 1,1,1-triiododecane; 1- bromo - 1,1 - dichlorooctane; 1,1-dichloro-3-pentene; and 1,1-dichloro-3-phenyl-octane.

Another component of the catalyst system for the process of this invention is an organo-aluminum component having at least one carbon to metal bond. This component can be represented by the general formula:

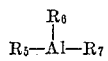

where Al is aluminum, $R_5$ is a hydrocarbon radical having between 1 and 6 carbon atoms and $R_6$ and $R_7$ can be the same or different and are selected from the group consisting of hydrogen, halogen, and hydrocarbon radicals having between 1 and 6 carbon atoms. The preferred organo-aluminum components are the aluminum alkyls and the aluminum alkyl halides.

Examples of suitable organo-aluminum components include, but are not limited to, aluminum hydride; trimethylaluminum; triethylaluminum; tri-n-hexylaluminum; diethylaluminum chloride; ethylaluminum dichloride; triisobutylaluminum; diethylaluminum hydride; and diethylaluminum sequichloride.

The concentration of the organo-aluminum component in the reaction mixture can vary between $3 \times 10^{-3}$ and one weight percent based on the olefinic hydrocarbon. The preferred concentrations of the organo-aluminum component are between 0.01 and 0.05 weight percent based on the olefinic hydrocarbon.

The molar ratio of the halogenated methane derivative to the organo-aluminum component should be at least 0.2:1. The molar ratio can suitably be between 0.2:1 and 100:1 and is preferably between 0.5:1 and 50:1. If the halogenated derivative of methane is liquid, it can serve as a reactant solvent and the molar ratio of the two components could be infinite.

It is well known, however, that the addition of halogenated derivatives of methane, such as $CCl_4$, and organo-aluminum components, such as triethylaluminum, are so reactive as to be explosive. It has been found that this is true only when the ratio of the halogenated derivative of methane to the organo-aluminum component is low, a molar ratio of 11:1 for carbon tetrachloride to triethylaluminum, for example, being explosive.

Generally, molar ratios of the halogenated methane derivative to the organo-aluminum component less than about 15:1 are explosive when admixed together without a diluent. If a diluent is employed, the exothermicity of the reaction can be controlled. The diluent can comprise excess halogenated methane derivative, olefinic hydrocarbon charge stock, or other hydrocarbons, such as saturated hydrocarbons and aromatic hydrocarbons. The olefinic hydrocarbon charge stock is the preferred diluent to obtain the highest space-time-yields from the reactor. The higher the molar ratio of the diluent to the organo-aluminum component, the less tendency there is for a violent reaction. It is preferred that the molar ratio of the diluent to the organo-aluminum component be at least 15:1 and more preferably the diluent is used in molar amounts of at least 50:1. The diluent can also be used in large excess in the nature of a solvent with only catalytic amounts of the organoaluminum component being used. For example, it was found that a mixture of carbon tetrachloride and triethylaluminum in the molar ratio of 135:1 was not explosive. The essential feature is to have a sufficient amount of diluent material present when the organo-aluminum component and the halogenated methane derivative are admixed to prevent an explosion. The organo-aluminum component and the halogenated methane derivative can be added together in various ways. For example, the organo-aluminum component can be added to a mixture of a liquid olefinic hydrocarbon, or other diluent as defined, and a halogenated methane derivative; the halogenated methane derivative can be added to a mixture of the olefinic hydrocarbon (or other diluent) and the organo-aluminum component; or the organo-aluminum component can be dissolved in a portion of the olefinic hydrocarbon charge stock and the halogenated methane derivative dissolved in a second portion of the olefinic charge stock before the portions are admixed.

The polymerization reaction can occur under any suitable polymerization conditions. For example, the polymerization can be initiated at very low temperatures including temperatures as low as —20° C. by the use of radiation, such as that obtained from Van Der Graaf accelerator, Cobalt 60 source, etc. Good results have been obtained when samples were irradiated with a Van Der Graaf with 3 mev. electrons to a total energy absorption of 20 microrads. A thermal means can also be employed and usually temperatures of between about 50° and 100° C. are suitable, with preferred temperatures between 60° and 80° C. The reaction pressure to employ is not critical and pressures of about atmospheric, or below, to 1,000 p.s.i.g. or higher, can be employed. The preferred pressure is, of course, atmospheric. The reaction must, of course, be run in the absence of oxygen-containing materials, such as water, air, etc. which would react with the organo-aluminum catalyst component in the known manner.

It is essential that the polymerization reaction be run in the presence of both the organo-aluminum component and the halogenated methane derivative as defined above. A polymerization reaction will not occur if either one of these components is absent from the reaction mixtures.

The products from this polymerization reaction are very viscous oils having a viscosity between about 30 and 90 centistokes at 100° F. and can suitably be employed as lubricated oils or as specialty oils. Solid products can also be produced from the higher olefins or diolefins, such as butadiene. The polymeric oil from hexene-1 had a molecular weight of about 860 as determined by the vapor-pressure-osmometer method.

It has also been found that the addition of certain metal salts selected from the group consisting of iron halides and niobium halides promote the subject reaction at lower temperatures. For example, it has been found that the addition of ferric chloride to the reaction system consisting of carbon tetrachloride and triethyl-aluminum promotes the polymerization of 1-hexene at room temperature, whereas, the same reaction mixture requires temperatures of about 80° C. in the absence of ferric chloride. Examples of suitable iron and niobium halides include, but are not limited to, niobium pentachloride; ferric chloride; ferrous chloride; niobium pentabromide; ferric bromide; ferrous bromide; and ferrous iodide.

The molar ratio of the particular metal halide salt to the organo-aluminum component can suitably be between 1:1, and 0.1:1, and is preferably between 0.5:1, and 0.3:1. The use of iron and niobium halides is unique in its promotional effect on the subject reaction. The use of other metal halides, such as copper chloride and chromium chloride, do not result in the lowering of the reaction temperature necessary to promote the subject reaction.

The invention will be further described with reference to the following experimental work.

EXAMPLE 1

Hexene-1 (0.056 mole) and 0.00518 mole of $CCl_4$ were admixed at room temperature and to this mixture was added 0.0036 mole of $Al(C_2H_5)_3$. The total reaction mixture was heated in a sealed tube at 70° C. for one hour. Analysis of the products showed practically complete polymerization of the 1-hexene (over 90 percent) to a liquid oil consisting of dimer, trimer and higher units of 1-hexene.

EXAMPLE 2

Example 1 was repeated except the reaction mixture was not heated but was cooled to 0° C. and irradiated with 3 mev. electrons to a total energy absorption of 20 microrads. Again, almost complete polymerization of the 1-hexene (over 90 percent) to a liquid oil consisting of dimer, trimer and higher units of 1-hexene was obtained.

EXAMPLE 3

Example 2 was repeated except the $Al(C_2H_5)_3$ was omitted. No polymerization of the 1-hexene was obtained.

EXAMPLE 4

Example 2 was repeated except the $CCl_4$ was omitted. No polymerization of the 1-hexene was obtained.

Examples 1 and 2 show that polymerization can occur under polymerization conditions which can be (1) thermal (Example 1), or (2) at low temperatures in the presence of ionizing radiation.

A comparison of Examples 2, 3 and 4 shows the criticality of having both the halogenated methane derivatives ($CCl_4$) and the organo-metallic [$Al(C_2H_5)_3$] compounds present to promote the subject polymerization reaction. When either the organo-metallic component (Example 3) or the halogenated methane derivative (Example 4) is omitted, polymerization does not occur.

EXAMPLE 5

An attempt was made to admix $7.3 \times 10^{-3}$ moles of $Al(C_2H_5)_3$ and $8.3 \times 10^{-2}$ moles of $CCl_4$, but an explosion occurred.

EXAMPLE 6

In this run, 0.5 cc. ($2.66 \times 10^{-3}$ moles) of tri-n-propylaluminum was admixed with 0.5 cc. ($5.18 \times 10^{-3}$ moles) of $CCl_4$ and an explosion occurred shortly after mixing.

EXAMPLE 7

Example 6 was repeated except 5 ccs. ($4 \times 10^{-2}$ moles) of 1-hexene were also present in the reaction mixture and after heating to 80° C. for four hours, the 1-hexene polymerized to a light viscous oil.

A comparison of Examples 1, 2, 5, 6 and 7 shows the criticality of the presence of the olefinic hydrocarbon, in order to prevent an explosion, when high molar ratios of the organo-aluminum component are employed.

EXAMPLE 8

In this run, $6.4 \times 10^{-2}$ moles of 1-hexene were admixed with $7.24 \times 10^{-4}$ moles of triethylaluminum at room temperature, and thereafter $7.24 \times 10^{-4}$ moles of $CCl_4$ were added to this mixture. No polymerization was observed after a month's time. The mixture was then heated at 80° C. for 1.5 hours and almost all of the 1-hexene polymerized to form a light oil.

EXAMPLE 9

Example 8 was repeated except the mixture was heated to 50° C. for two hours and then cooled to room temperature. Polymerization of the 1-hexene to a light oil was complete in about 10 hours.

A comparison of Examples 1, 2, 8 and 9 shows that polymerization will occur under proper polymerization conditions.

EXAMPLE 10

In this run, 0.1 cc. of $CCl_4$ was admixed with 8 ccs. of 1-hexene and to this mixture was added 0.1 cc. of $Al(C_2H_5)Cl_2$. The polymerization reaction of the 1-hexene proceeded at room temperature and was over in three minutes. A clear, viscous oil was produced.

A comparison of Example 10 with Example 1 shows that the halogen substituted organo-aluminum components are more active than the trialkylaluminum compounds since the reaction proceeds at room temperature rather than requiring heating.

EXAMPLE 11

Example 10 was repeated except tri-n-hexylaluminum [$Al(C_6H_{13})_3$] was used in place of the $Al(C_2H_5)Cl_2$, the reaction temperature was 80° C. and the reaction time three hours. No polymerization occurred.

EXAMPLE 12

In this run, 0.20 cc. ($5.9 \times 10^{-4}$ moles) of tri-n-hexylaluminum was admixed with 0.20 cc. ($2.0 \times 10^{-3}$ moles) of $CCl_4$ in 8 ccs. ($6.4 \times 10^{-2}$ moles) of 1-hexene. This reaction mixture was subjected to radiation with 3 mev. electrons at 0° C. and the 1-hexene polymerized after a ten-minute exposure.

A comparison of Examples 11 and 12 shows that temperatures of 80° C. are insufficient to promote the polymerization of hexene-1 when tri-n-hexylaluminum is employed as the organo-aluminum component, however, the reaction proceeds smoothly under radiation and lower temperatures as exemplified in Example 12.

EXAMPLE 13

Example 11 was repeated except a mixture of tri-n-butylaluminum and tiisobutylaluminum was employed in place of the tri-n-hexylaluminum. No polymerization occurred.

EXAMPLE 14

Example 12 was repeated except triisobutylaluminum was used in place of the tri-n-hexylaluminum. Again, polymerization occurred after a ten-minute radiation with the 3 mev. electrons.

A comparison of Examples 13 and 14 shows that reaction temperatures of 80° C. are insufficient to promote the polymerization of 1-hexene when tri-n-butylaluminum and triisobutylaluminum are employed as the organo-aluminum component, but the reaction is induced (Example 14) when radiation is employed.

EXAMPLE 15

A series of three runs were made to initiate the polymerization of 1-hexene at 0° C. with 3 mev. electron radiation at various concentrations of triethylaluminum and $CCl_4$. The runs are summarized in Table I below:

TABLE I

| Run No. | 1 | 2 | 3 |
|---|---|---|---|
| Triethylaluminum (TEA): | | | |
| Ccs. | 0.1 | 0.1 | 0.1 |
| Moles | $7.24 \times 10^{-4}$ | $7.24 \times 10^{-4}$ | $7.24 \times 10^{-4}$ |
| $CCl_4$: | | | |
| Ccs. | 0.07 | 0.14 | 3.86 |
| Moles | $7.24 \times 10^{-4}$ | $1.45 \times 10^{-3}$ | $4.0 \times 10^{-2}$ |
| 1-hexene: | | | |
| Ccs. | 8 | 8 | 5 |
| Moles | $6.4 \times 10^{-2}$ | $6.4 \times 10^{-2}$ | $4.0 \times 10^{-2}$ |
| Time to react (minutes) | 10 | 10 | 5 |

Referring to Runs 1 and 2 in Table I, doubling the ccs. per hour for 0.5 hour. No polymerization occurred. tion based on the hexene constant, results in the same amount of radiation reaction time. Run 3 in Table I shows that increasing the TEA concentration in the 1-hexene results in a decreased reaction time even though more $CCl_4$ is employed.

EXAMPLE 16

In the run for this example, 1 cc. of triethylaluminum; 1 cc. of carbon tetrachloride; and 100 ccs. of n-hexane were admixed and heated to 80° C. Ethylene was then passed through the reaction mixture at the rate of 350 ccs. per hour for 0.5 hour. No polymerization occurred.

Example 16 shows that the use of the gaseous olefins, such as ethylene and propylene, are undesirable in the subject reaction.

EXAMPLE 17

In this run, 50 ccs. (0.52 mole) of $CCl_4$ were admixed at room temperature and in a closed system with 25 ccs. (0.20 mole) of 1-hexene and to this mixture was added 0.5 cc. (0.0036 mole) of triethylaluminum $[Al(C_2H_5)_3]$ and 0.2 gram (0.0012 mole) of ferric chloride ($FeCl_3$). After an hour induction period, a very exothermic reaction took place. The 1-hexene was almost all (over 99 weight percent) converted to a low molecular weight (about 860) oil. The dimer and trimer was removed by vacuum distillation and the resulting oil had the following properties:

Viscosity (centistokes):
    100° F. _____ 70.29
    210° F. _____ 9.21
Viscosity Index _____ 114
Pour Point, ° F. _____ −40

A comparison of Examples 1 and 17 shows that the addition of $FeCl_3$ has a beneficial effect on the reaction in that the reaction can now proceed at lower temperatures.

EXAMPLE 18

Example 17 was repeated except hexane was used in place of $CCl_4$. The olefin remained unchanged after three days. Subsequent heating to 80° C. for six hours did not result in polymerization of the olefin.

A comparison of Examples 17 and 18 again shows the criticality of having the halogenated derivative of methane present in the reaction mixture.

EXAMPLE 19

In this run, 75 ccs. of $CCl_4$ were admixed with 15 ccs. of 1-hexene and to this mixture was added 0.25 cc. of $Al(C_2H_5)_3$ and 0.1 gram of niobium pentachloride at room temperature and in a closed system. Reaction proceeded at room temperature (after a 15-minute induction period) to give a liquid oily polymer.

A comparison of Examples 1, 17 and 19 shows that $NbCl_5$ also has a beneficial effect on the subject reaction.

EXAMPLE 20

Example 17 was repeated except copper chloride ($CuCl_2$) was used in place of the ferric chloride. No polymerization occurred at room temperature. The yellow $CuCl_2$ which is insoluble in $CCl_4$ and 1-hexene, immediately turned black on addition of $Al(C_2H_5)_3$. After 10 minutes the black precipitate disappears and the solution becomes homogeneous and clear, i.e., no color.

EXAMPLE 21

Example 17 was repeated except chromium chloride ($CrCl_3$) was used in place of ferric chloride ($FeCl_3$). No polymerization occurred at room temperature over a period of one week.

A comparison of Examples 17, 19, 20 and 21 shows that some anhydrous metal halides (iron and niobium) promote the subject reaction at lower temperatures while other metal halides (copper and chromium) do not.

EXAMPLE 22

Example 20 was repeated except only 20 ccs. of 1-hexene were employed and vinyl chloride was passed through the colorless solution at room temperature. No polymerization occurred.

EXAMPLE 23

Example 22 was repeated except butadiene was employed in place of vinyl chloride. Again, no polymerization occurred.

A comparison of Examples 20, 22 and 23 shows that even the addition of the more reactive vinyl chloride and butadiene monomers results in no polymerization at room temperature, further showing that copper halides do not promote the subject reaction at reduced temperatures.

EXAMPLE 24

Example 20 was repeated except the temperature was increased to 75° C. for 45 minutes. The 1-hexene polymerized, and after removal of dimer and trimer, an oil was obtained having a pour point of below −65° F.

A comparison of Examples 20 and 24 shows that the presence of the copper halide has no adverse effect on the reaction, that is, the reaction proceeds smoothly upon increasing the reaction temperature.

EXAMPLE 25

Example 24 was repeated except hexane was used in place of $CCl_4$. No polymerization was observed.

A comparison of Examples 24 and 25 again shows the criticality of employing the halogenated methane derivative, i.e., $CCl_4$.

It has also been found that increased yields of polymer can be obtained by a two-step process comprising first contacting a reaction mixture containing a liquid halogenated methane derivative, as defined above, and an organo-metallic component, as defined above, wherein the molar ratio of the halogenated methane derivative to the organo-aluminum component is such that an explosive reaction does not occur with a gaseous olefinic hydrocarbon having between 2 and 3 carbon atoms per molecule; and thereafter contacting the reaction mixture with an olefinic hydrocarbon having at least one alpha olefinic double bond and at least four carbon atoms per molecule as defined above under polymerization conditions.

It is preferred that the gaseous olefin be ethylene and the ethylene be passed through the mixture of the organo-aluminum component and liquid halogenated methane derivative for at least 10 minutes and preferably between 10 and 30 minutes at a rate of between about 130 and 350 milliliters per hour. The ethylene can be passed through under any suitable conditions including a temperature between −20° and 100° C. and pressures between 15 and 1000 p.s.i.g.

The preferred olefinic hydrocarbons having at least one alpha olefinic double bond and at least four carbon atoms per molecule are the conjugated diolefinic hydrocarbons having between 4 and 20 carbon atoms per molecule. By a conjugated diolefin is meant a diolefinic hydrocarbon where the olefinic double bonds are separated by a single carbon bond. Examples of the preferred conjugated diolefins include, but are not limited to, 1,3-butadiene; 1,3-pentadiene; 2-methyl - 1,3-butadiene; 1,3-hexadiene; 2,4-hexadiene; 2 - methyl-1,3-pentadiene; 3 - methyl-1,3-pentadiene; 2,3-dimethyl - 1,3 - butadiene; 1-phenyl-1,3-butadiene; 2-methyl - 1,3-heptadiene; 2,5,5-trimethyl-1,3-hexadiene; 3,7-dimethyl - 1,3 - octadiene; 2,3-di-t-butyl-1,3-butadiene; 2,5-dimethyl - 3,4 - diisopropyl-2,4-hexadiene and 2-phenyl-1,3-heptadiene.

It is also preferred that the halogenated methane derivative be employed in a molar ratio to the organo-aluminum component of at least 120:1 and preferably between 135:1 and 150:1. Carbon tetrachloride is the preferred halogenated methane derivative, and when used in the above amounts, functions as a solvent.

The metal salts defined above can also, of course, be present in this embodiment of the invention, and, in fact, $NbCl_5$ is employed in the experimental work below which aids in further defining the invention.

EXAMPLE 26

In this run, 1 cc. of $Al(C_2H_5)_3$ was added to a mixture of 0.1 gram of $NbCl_5$ in 100 ccs. of $CCl_4$. Butadiene at the rate of 250 ccs. per minute was passed through the mixture at room temperature (about 20° C.) for 15 minutes and 2 grams of a yellow polymer powder were recovered. According to infrared analysis, the material was a trans-polybutadiene.

EXAMPLE 27

Example 26 was repeated except before the butadiene was added, ethylene was passed through at room temperature and atmospheric pressure for 10 minutes at the rate of 350 ccs. per minute. The butadiene was added at the rate of 300 ccs. per minute and after 15 minutes, 17 grams of a light yellow polymer were formed. Infrared analysis showed this material was substantially all trans-polybutadiene. Example 27 was re-run giving substantially the same results.

A comparison of Examples 26 and 27 shows the greatly increased yields (more than an eight-fold increase) from employing the two-step procedure of initially contacting the reaction mixture with the gaseous olefin.

EXAMPLE 28

Example 27 was repeated except 150 ccs. of CCl₄ were employed along with 25 ccs. of benzene as the solvent. The yield of light yellow polymer powder was 22 grams.

Example 28 compared with Example 27 shows that the presence of an inert hydrocarbon, i.e., benzene, is not detrimental to the reaction.

It is not understood why the above procedure results in the increased yields of polymer. It may be that a type of seeding effect is taking place. However, since the low carbon number olefins, such as ethylene and propylene, do not polymerize well in the reaction system of this invention, it was unexpected to discover that the prior addition of ethylene resulted in substantially increased yields of polymer from the olefinic hydrocarbon charge stocks of this invention which contain at least 4 carbon atoms per molecule. There is certainly more than an additive effect of the two reactions separately.

Resort may be had to such variations and modifications as fall within the spirit of the invention and the scope of the appended claims.

I claim:

1. A process for the polymerization of an olefinic hydrocarbon having at least one alpha-olefinic double bond and at least four carbon atoms per molecule which comprises:
   contacting at least one of said olefinic hydrocarbons under polymerization conditions comprising high energy ionizing radiation with a catalyst system comprising:
   a halogenated derivative of methane containing at least two halogen atoms directly connected to the same carbon atom, and
   an organo-aluminum component having at least one carbon to metal bond.

2. A process for the polymerization of an olefinic hydrocarbon having at least one alpha-olefinic double bond and at least four carbon atoms per molecule which comprises:
   contacting at least one of said olefinic hydrocarbons under polymerization conditions with a catalyst system comprising a halogenated derivative of methane containing at least two halogen atoms directly connected to the same carbon atom;
   an organo-aluminum component having at least one carbon to metal bond; and
   a metal salt selected from the group consisting of iron halides and niobium halides.

3. A process according to claim 2 wherein the metal salt is niobium pentachloride.

4. A process according to claim 2 wherein the metal salt is ferric chloride.

5. A process for the polymerization of an olefinic hydrocarbon having at least one alpha-olefinic double bond and at least four carbon atoms per molecule which comprises:
   separately adding to a mixture of at least one of said olefinic hydrocarbons and a metal salt selected from the group consisting of iron halides and niobium halides under polymerization conditions;
   a halogenated derivative of methane containing at least two halogen atoms directly connected to the same carbon atom; and
   an organo-aluminum component having at least one carbon to metal bond.

6. A process according to claim 5 wherein the molar ratio of the metal salt to the organo-aluminum component is between 1:1 and 0.1:1.

7. A process according to claim 6 wherein the halogenated derivative of methane is carbon tetrachloride.

8. A process for the polymerization of an olefinic hydrocarbon having at least one alpha-olefinic double bond and at least four carbon atoms per molecule which comprises:
   contacting a reaction mixture consisting of a halogenated derivative of methane containing at least two halogen atoms directly connected to the same carbon atom;
   an organo-aluminum component having at least one carbon to metal bond;
   a first olefinic hydrocarbon having between 2 and 3 carbon atoms per molecule; and
   thereafter contacting the reaction mixture with a second olefinic hydrocarbon having at least four carbon atoms per molecule under polymerization conditions.

9. A process according to claim 8 wherein the halogenated derivative of methane is carbon tetrachloride and the first olefinic hydrocarbon is ethylene.

10. A process for the polymerization of an olefinic hydrocarbon having at least one alpha-olefinic double bond and at least four carbon atoms per molecule which comprise:
    contacting a reaction mixture consisting of a halogenated derivative of methane containing at least two halogen atoms directly connected to the same carbon atom;
    an organo-aluminum component having at least one carbon to metal bond and a metal salt selected from the group consisting of iron halides and niobium halides with
    a first olefinic hydrocarbon having between 2 and 3 carbon atoms per molecule; and
    thereafter contacting the reaction mixture wth a second olefinic hydrocarbon having at least four carbon atoms per molecule under polymerization conditions.

11. A process according to claim 10 wherein the halogenated derivatives of methane is carbon tetrachloride, the first olefinic hydrocarbon is ethylene, and the second olefinic hydrocarbon is butadiene.

12. In a process according to claim 1 wherein the halogenated derivative of methane has the formula:

where $x_1$ and $x_2$ can be any halogen atom and $R_3$ and $R_4$ are selected from the group consisting of halogen, hydrogen, and any hydrocarbon radical having between one and ten carbon atoms.

13. A process according to claim 1 wherein the organo-aluminum component has the general formula:

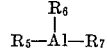

where Al is aluminum; $R_5$ is a hydrocarbon radical having between one and six carbon atoms; $R_6$ is selected from the group consisting of hydrogen, halogen, and hydrocarbon radicals having between one and six carbon atoms; and $R_7$ is selected from the group consisting of hydrogen, halogen and hydrocarbon radicals having between one and six carbon atoms.

14. A process for the polymerization of an olefinic hydrocarbon having the formula:

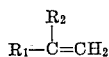

where $R_1$ is selected from the group consisting of hydrogen, a hydrocarbon radical and halogen; and $R_2$ is any hydrocarbon radical; and wherein the sum of the carbon atoms in $R_1$ and $R_2$ is at least two which comprises: contacting at least one of said olefinic hydrocarbons under polymerization conditions comprising high energy ionizing radiation with a catalyst system comprising:

a halogenated derivative of methane having the general formula:

where $x_1$ and $x_2$ can be any halogen atom and $R_3$ and $R_4$ are selected from the group consisting of halogen, hydrogen and any hydrocarbon radical having between one and ten carbon atoms; and an organo-aluminum component having the formula:

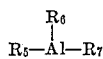

where Al is aluminum; $R_5$ is a hydrocarbon radical having between one and six carbon atoms; $R_6$ is selected from the group consisting of hydrogen, halogen and hydrocarbon radicals having between one and six carbon atoms; and $R_7$ is selected from the group consisting of hydrogen, halogen and hydrocarbon radicals having between one and six carbon atoms.

15. A process according to claim 14 wherein a sufficient amount of the halogenated derivative of methane is employed to act as a solvent.

16. A process according to claim 15 wherein the halogenated derivative of methane is carbon tetrachloride.

17. A process according to claim 14 wherein the organo-aluminum component is aluminum triethyl.

18. A process according to claim 17 wherein the olefinic hydrocarbon is 1-hexene.

19. A process according to claim 8 wherein the first olefinic hydrocarbon is ethylene.

20. A process according to claim 10 wherein the halogenated derivative of methane is a carbon tetrachloride and the organo-aluminum component is a trialkyl aluminum.

21. A process according to claim 20 wherein the second olefinic hydrocarbon is a conjugated diolefinic hydrocarbon having between 4 and 20 carbon atoms per molecule.

22. A process according to claim 21 wherein the organo-aluminum component is triethylaluminum; the carbon tetrahalide is carbon tetrachloride and the first olefin is ethylene.

23. A process according to claim 22 wherein the diolefinic hydrocarbon is 1,3-butadiene.

24. A process according to claim 21 wherein the organo-aluminum component is triisobutylaluminum; the carbon tetrahalide is carbon tetrachloride and the first olefin is ethylene.

25. A process according to claim 21 wherein the first olefin is ethylene which is passed through said reaction mixture for a time between 10 and 30 minutes at a rate between about 130 and 350 milliliters per hour.

References Cited

UNITED STATES PATENTS

| | | | |
|---|---|---|---|
| 3,031,514 | 4/1962 | Kosmin | 260—671 |
| 3,265,604 | 8/1966 | Harlan | 204—159.24 |
| 3,312,748 | 4/1967 | Johnson | 260—671 |

OTHER REFERENCES

Chapiro, A.: "Radiation Chemistry of Polymer Systems," Interscience Publishers, New York, 1962.

JOSEPH L. SCHOFER, *Primary Examiner.*

R. A. GAITHER, *Assistant Examiner.*

UNITED STATES PATENT OFFICE
CERTIFICATE OF CORRECTION

Patent No. 3,397,194                                         August 13, 1968

Harold E. Swift

It is certified that error appears in the above identified patent and that said Letters Patent are hereby corrected as shown below:

Column 1, line 35, "rensity" should read -- density --.
Column 6, line 53, "ccs. per hour for 0.5 hour. No polymerization occurred." should read -- $CCl_4$ concentration while keeping the TEA concentra- --.

Signed and sealed this 13th day of January 1970.

(SEAL)
Attest:

Edward M. Fletcher, Jr.                          WILLIAM E. SCHUYLER, JR.
Attesting Officer                                         Commissioner of Patents